United States Patent
Buisman et al.

[11] Patent Number: 5,891,408
[45] Date of Patent: Apr. 6, 1999

[54] PROCESS FOR PURIFYING FLUE GAS CONTAINING NITROGEN OXIDES

[75] Inventors: Cees Jan Nico Buisman, Harich; Hendrik Dijkman, Imist; Petrus Leonardus Verbraak, Weesp; Adrianus Johannes Den Hartog, Oegstgeest, all of Netherlands

[73] Assignee: Biostar Development C.V., Balk, Netherlands

[21] Appl. No.: 875,875

[22] PCT Filed: Feb. 6, 1996

[86] PCT No.: PCT/NL96/00057

§ 371 Date: Sep. 18, 1997

§ 102(e) Date: Sep. 18, 1997

[87] PCT Pub. No.: WO96/24434

PCT Pub. Date: Aug. 15, 1996

[30] Foreign Application Priority Data

Feb. 6, 1995 [NL] Netherlands ............. 9500215
Aug. 7, 1995 [EP] European Pat. Off. ....... 95202154

[51] Int. Cl.$^6$ ............ C01B 21/00; C01B 17/20; B01D 53/00; C02F 3/30
[52] U.S. Cl. .............. 423/235; 423/242.2; 435/262; 210/605
[58] Field of Search ................... 435/168, 262; 423/235, 242.2; 210/603, 605

[56] References Cited

U.S. PATENT DOCUMENTS

| | | | |
|---|---|---|---|
| 3,984,522 | 10/1976 | Saito et al. | 423/235 |
| 5,196,176 | 3/1993 | Buisman | 423/242.2 |

FOREIGN PATENT DOCUMENTS

| | | |
|---|---|---|
| 0 326 457 | 8/1989 | European Pat. Off. . |
| 0 451 922 | 10/1991 | European Pat. Off. . |
| 24 45 567 | 4/1975 | Germany . |
| 37 04 516 | 8/1988 | Germany . |
| 4003064 | 8/1991 | Germany . |
| WO 91/18661 | 12/1991 | WIPO . |
| WO 93/18800 | 9/1993 | WIPO . |

*Primary Examiner*—Gary P. Straub
*Assistant Examiner*—Milan M. Vinnola
*Attorney, Agent, or Firm*—Young & Thompson

[57] ABSTRACT

A process and a device for purifying flue gas containing nitrogen oxides, in which the flue gas is scrubbed with a circulating scrubbing liquid which contains a transition metal chelate such as Fe (II) EDTA and the complex formed from nitrogen oxide and transition metal chelate and/or spent transition metal chelate is regenerated biologically in the presence of an electron donor, nitrogen oxide being reduced to molecular nitrogen. The biological reactor can be combined with the gas scrubber. The electron donor is, for example, hydrogen or methanol, but may also be sulphite which originates from sulphur dioxide in the flue gas.

10 Claims, 2 Drawing Sheets

PROCESS FOR PURIFYING FLUE GAS CONTAINING NITROGEN OXIDES

FIELD OF THE INVENTION

The invention relates to a process for purifying flue gas containing nitrogen oxides, in which the flue gas is scrubbed with a circulating scrubbing liquid which contains a transition metal chelate, the chelate forms a complex with nitrogen oxide, nitrogen oxide is reduced to molecular nitrogen, and the chelate is subsequently regenerated.

BACKGROUND OF THE INVENTION

Such a process is disclosed, for example, in Dutch Patent Applications 7500672, 7500673, 7515009, 7607212 and 8602001, and European Patent Application 531762. The transition metal chelate, usually iron(II)-EDTA, is used to complex and thus to effectively absorb the nitrogen oxides, of which NO is very sparingly dissolved by scrubbing water that does not contain a transition metal chelate.

The known processes each involve the simultaneous removal of nitrogen oxides (mainly NO and $NO_2$), hereinafter referred to as NOx, and sulphur dioxide, molecular nitrogen ($N_2$) and sulphates or amide-sulphates and many other N-S compounds generally as well as $N_2O$ being ultimately obtained. The processing of the sulphates, $N_2O$ and nitrogen-sulphur compounds is, however, complicated and requires various subsequent treatments with associated equipment. $N_2O$ will be emitted with the flue gas. This is an unwanted effect since $N_2O$ is a compound known for its strong detrimental effect on the ozone layer and its strong greenhouse effect.

Another important problem is that, in the oxidizing medium, the active Fe(II) is partially converted to the much less active Fe(III) by oxygen from the flue gas or indirectly by sulphite in the scrubbing liquid. This results in high losses of the chelate. In addition, flue gas usually contains too little sulphur dioxide (sulphite) in relation to nitrogen oxides for the complete regeneration of the NO-bonded Fe(II)-EDTA complex to its active form. Such methods have therefore not yet acquired large-scale application.

In a process which is already used in practice for the removal of nitrogen oxides from flue gases, the flue gas is contacted at 300° C. with ammonia ($NH_3$) and a catalyst, in which process nitrogen is produced. This process, the so-called selective catalytic reduction (SCR) process, however, is expensive, both as a result of the high investment costs associated with the high-temperature installations and as a result of the high operational costs associated with the ammonia and the catalyst (approximately one third of the catalyst has to be replaced every year). In addition, a completely separate process is necessary for the optional removal of sulphur dioxide from the same flue gas.

SUMMARY OF THE INVENTION

The invention relates to a process which allows nitrogen oxides to be efficiently removed from flue gases for appreciably lower investment and operating costs, in which the NOx removal may optionally be combined with removal of sulphur dioxide. Surprisingly, it has been found that a complex of a transition metal chelate and nitrogen oxide can effectively be regenerated microbiologically to molecular nitrogen and the regenerated transition metal chelate. In this process, the transition metal is kept in the more active, lower oxidation state or returned to the lower oxidation state.

The process according to the invention as described in the introduction is therefore characterized in that the transition metal chelate is biologically regenerated in the presence of an electron donor. Where reference is made herein to chelate, this is understood to mean the complex of chelating agent and transition metal.

The biological regeneration according to the invention therefore involves the complex of nitrogen oxide and transition metal chelate, or the transition metal chelate without nitrogen oxide. In the former case, nitrogen oxide is reduced with concomitant release of active chelate; in the latter case, inactive chelate wherein the transition metal is in a higher oxidation state is regenerated to active chelate wherein the metal is again in a lower oxidation state. A major advantage of this process is that any chelate that is consumed by other processes and would thus not be available for binding NOx, is returned to its active form. In principle, the inactive form of the chelate could be regenerated e.g. by the addition of a chemical reducing agent or by electrochemical reduction, but in practice this is undesirable because of the higher costs and complications in the scrubbing cycle.

As transition metal that forms a complex with nitrogen oxide when chelated, use may be made of a metal such as iron, manganese, zinc, cobalt, nickel or aluminum. For economic and environmental reasons, iron(II), which is kept in the divalent state in the process according to the invention, is preferred. The transition metal chelate is formed with a chelating agent which has available at least two free electron pairs for chelation with the metal, in the form of amino groups, carboxyl groups or hydroxyl groups. Examples are polyamines such as ethylenediamine, diethylenetriamine, triethylenetetraamine, hexamethylenetetraamine, and 1,4,7-triazonane and their N-alkylated analogues such as polyamines such as ethylenediamine which contain one to four hydroxyethyl groups and/or carboxymethyl groups, for example N-(2-hydroxyethyl)ethylenediamine-triacetic acid and, in particular, ethylenediamine-tetraacetic acid (EDTA), iminodiacetic acid and nitrilo-triacetic acid (NTA) and salts thereof. The concentration of the transition metal chelate may vary according to the specific scrubbing process parameters. A suitable concentration can be e.g. 1–200 mM, in particular 25–150 mM.

In the process according to the invention, the following reactions occur, in which NO is chosen as nitrogen oxide and iron(II) ethylenediaminetetraacetate is chosen by way of example of transition metal chelate:

NO+EDTA-Fe→NO-EDTA-Fe

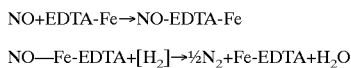

In this reaction, the hydrogen may be molecular hydrogen. The hydrogen may also be present as (organic) electron donor, for example as methanol, which is oxidized to carbon dioxide under the circumstances, or ethanol. It may also be in the form of other organic matter (COD) contained in the liquid (waste) stream.

The scrubbing of the flue gas can be carried out in a conventional gas scrubber. The biological regeneration of the complex of transition metal chelate and nitrogen oxide may be carried out in the scrubber itself, or in a separate bioreactor. The biomass required for the biological regeneration contains known nitrate-reducing bacteria.

A device for the removal of NOx from waste gases in which the biological regeneration takes place in the scrubber is shown diagrammatically in FIG. 1. In such a device, the gas is brought into intimate contact with the scrubbing liquid containing the transition metal chelate and the biomass, for example by means of nozzles and optionally packing material. An electron donor such as methanol is added to the scrubbing liquid. The nitrogen formed and any carbon dioxide are removed with the purified gas.

The variant in which the biological regeneration is carried out in a separate bioreactor is shown diagrammatically in FIG. 2. In such a device, the scrubbing liquid contains the transition metal chelate and the scrubbing liquid used is conveyed to the bioreactor which contains the biomass and to which an electron donor is added.

The process according to the invention can readily be combined with flue-gas desulphurization, in which case the sulphur dioxide absorbed from the flue gas can fulfil the function of reducing agent (electron donor). The regeneration could then proceed according to the reaction below:

$$NO\text{-}Fe\text{-}EDTA + SO_3^{2-} \rightarrow \tfrac{1}{2}N_2 + Fe\text{-}EDTA + SO_4^{2-}$$

The sulphate formed in this process can be removed in a conventional manner (precipitation with calcium), but is preferably removed biologically. The sulphate, possibly with residual sulphite, is therefore anaerobically reduced, mainly to sulphide, and the sulphide formed in this process is then oxidized under limited aerobic conditions to elemental sulphur, which is separated off.

A problem with the conventional process is that the reaction producing molecular nitrogen is just one of several reaction occurring and often it is not even the main reaction. Product like amide-sulphates and similar compounds, as well as $N_2O$ are formed. These products result in contamination of the flue gas ($N_2O$) and of the bleed water (amide-sulphates). In the process of the invention, these components are also converted to unharmful products, and thus unwanted emissions are prevented.

The reduction of NOx can also be achieved by the presence of other reduced sulphur compounds such as sulphide, hydrosulphide, sulphur, thiosulphate or polythionate. Such sulphur compounds may originate directly or indirectly from flue gases, or be added separately, for example from liquid waste flows.

If sulphur dioxide and other sulphur compounds are used as reducing agent, the biological regeneration of the complex of transition metal chelate and nitrogen oxide can also be carried out in the scrubber itself or in a separate bioreactor. A device for the process in which the nitrogen reduction is carried out in the scrubber is shown in FIG. 3. The redox potential in the scrubbing liquid containing biomass is in this case preferably kept high enough to avoid sulphate reduction to occur because this may result in undesirable $H_2S$ emission. Preferably, the redox potential is kept above −280 mV, in particular above −200 mV (using an Ag/AgCl reference electrode). The redox potential can be controlled by means of the addition of electron donor.

In contrast to the system according to FIG. 1, the scrubbing liquid should be post-treated outside the scrubber in the case of reduction with sulphur dioxide in order to remove the sulphate formed and residual sulphite. That can be done by means of a precipitation tank for forming gypsum (not shown). According to a preferred embodiment, the sulphate is worked up microbiologically by consecutive reduction to sulphide in an anaerobic reactor and oxidation of the sulphide to elemental sulphur in an aerobic reactor, as shown in FIG. 3.

The same process, but with nitrogen reduction in a separate bioreactor, can be carried out according to the system of FIG. 4. In this case an anoxic bioreactor for reducing nitrogen oxide, an anaerobic reactor for sulphate reduction and an aerobic reactor for sulphide oxidation are consecutively connected downstream of the scrubber.

The reduction of nitrogen can also be carried out in one of the sulphur reactors. This variant can be carried out in accordance with the system of FIG. 5. The NOx together with sulphate/sulphite can be reduced to nitrogen and sulphide, respectively, by a mixed anaerobic biomass. The residual NOx in the last, aerobic reactor can also be converted to molecular nitrogen by reaction with sulphide, elemental sulphur and possibly thiosulphate. Reduction of NOx to $N_2$ in the final, aerobic reactor is generally preferred because less electron donor has to be added in that case. For that purpose, it may be necessary to shorten the residence time in the anaerobic reactor so that not all the NOx is already fully reduced therein.

If the gas to be purified contains, in addition to nitrogen oxides, too low a concentration of sulphur dioxide, there may be insufficient sulphite present in the bioreactor to reduce the nitrogen oxide completely. Another electron donor (for example alcohol) will then have to be added.

An important factor that prohibited the use of the Fe chelate up to now is the oxidation of the active Fe(II) form to the inactive Fe(III) form by oxygen from the flue gas or by sulphite. According to the present invention, any Fe(III) formed is reduced by or in the presence of the bacteria. The biological reactor could be used only to reduce the inactive Fe(III) into the active Fe(II) form and make the system more cost efficient.

The biological reduction of nitrogen oxide (that is to say, the regeneration of the transition metal complex) is carried out at approximately neutral pH, for example a pH between 5 and 9.5, and at elevated temperature, for example 25 to 95° C., in particular 35 to 70° C.

DETAILED DESCRIPTION OF THE INVENTION

EXAMPLE 1

The performance of the nitrate-reducing bacteria is studied on a laboratory scale installation. This installation consists of a scrubber and a separate bioreactor. Besides the Fe-EDTA solution, pure NO is led through the scrubber, resulting in a total conversion of Fe-EDTA into NO-Fe-EDTA. Subsequently the NO-Fe-EDTA complex is converted in the bioreactor to Fe-EDTA and $N_2$ using ethanol as an electron donor. The volume of the bioreactor is 5 dm$^3$. After the treatment, the liquid is returned to the scrubber where Fe-EDTA can again undergo complexation with NO. During the experiments, the temperature is kept constant at 50° C. and pH at 7.0. The Fe-EDTA concentrations used are up to a value of 40 mM. The bacteria convert the NO-Fe-EDTA complex to Fe-EDTA and $N_2$ through the following equation:

$$6NO\text{-}Fe\text{-}EDTA + C_2H_5OH \rightarrow 6Fe\text{-}EDTA + 3N_2 + 2CO_2 + 3H_2O$$

The highest NO-Fe-EDTA load tested is 5.0 kg nitrogen/m³ day, which is completely converted by the bacteria. The maximum NO-Fe-EDTA load that can be handled by the bacteria has not been observed yet. Toxicity tests have shown that the bacteria are not inhibited by Fe-EDTA up to a concentration of 40 mM. It is expected from these experiments that higher Fe-EDTA levels can be used. Toxicity of Fe-EDTA above this concentration was not determined. During the experiments no chelate degradation was observed. In addition to the regeneration of the NO-Fe-EDTA complex, the bacteria have shown their capability of reducing inactive Fe(III)-EDTA to active Fe(II)-EDTA. The Fe(III)-EDTA is formed due to reaction of Fe(II)-EDTA with oxygen present in the flue gas, and due to reaction of NO-Fe-EDTA with sulphite. In the corresponding experiments air instead of NO is led through the scrubber, resulting in complete oxidation of Fe(I)-EDTA to Fe(III)-EDTA. Subsequently Fe(II)-EDTA is recovered in the bioreactor. At a 5 mM Fc(III)-EDTA influent concentration and a hydraulic retention time of 1.5 hour in the bioreactor the bacteria have shown complete reduction to Fe(II)-EDTA. Higher Fe(II)-EDTA concentrations have not been applied.

EXAMPLE 2

Figure 1:
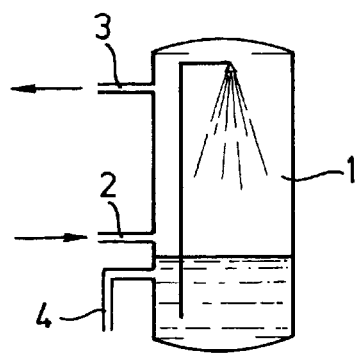
FIG. 1 shows a device according to the invention for removing nitrogen oxides in a single scrubber/reactor.
Figure 2:
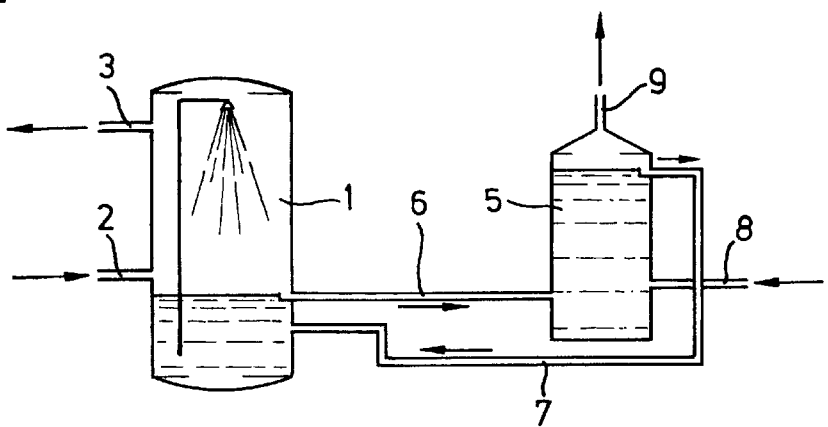
FIG. 2 shows a device for removing nitrogen oxides in a separate bio-reactor.
Figure 3:
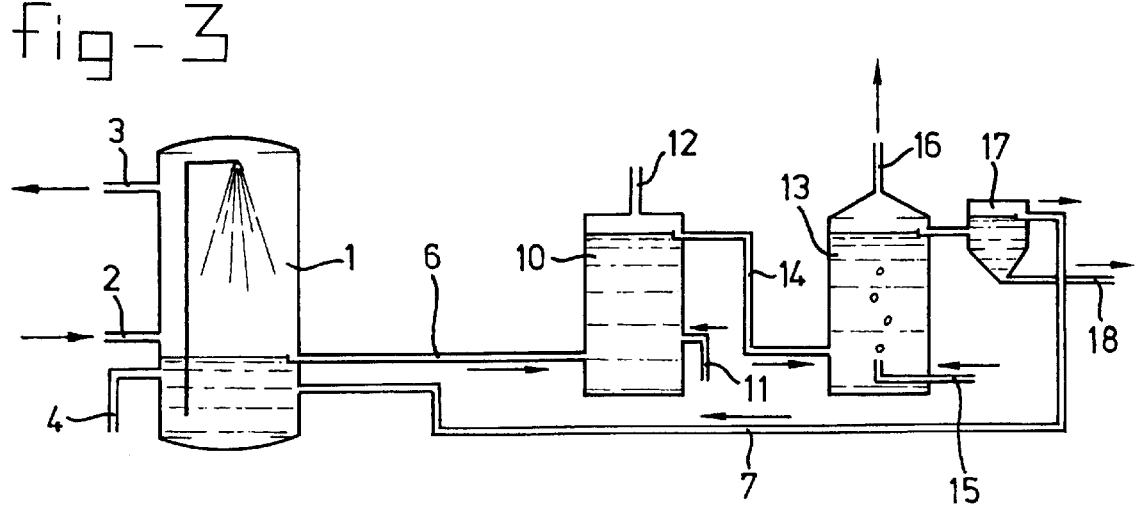
FIG. 3 shows a device for removing nitrogen oxides and sulphur oxides with denitrification in the scrubber.
Figure 4:
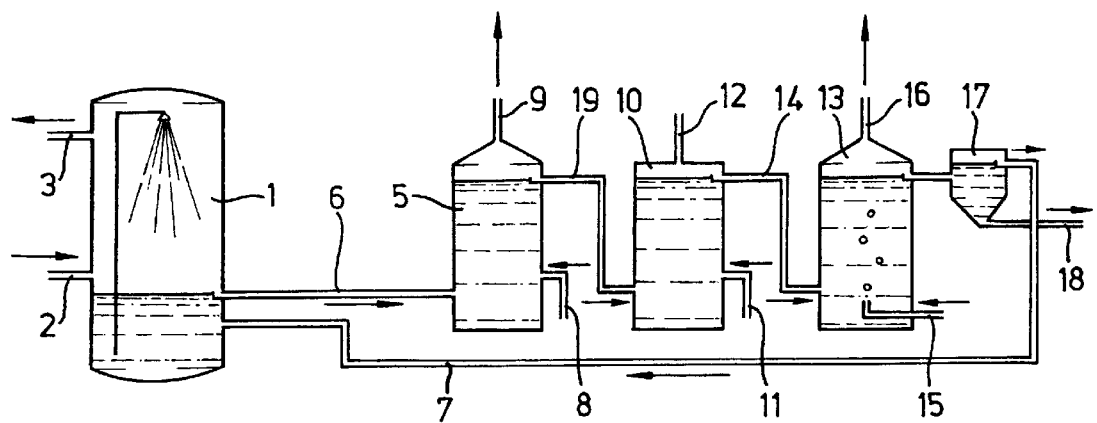
FIG. 4 shows a device for removing nitrogen oxides and sulphur oxides with separate denitrification.
Figure 5:
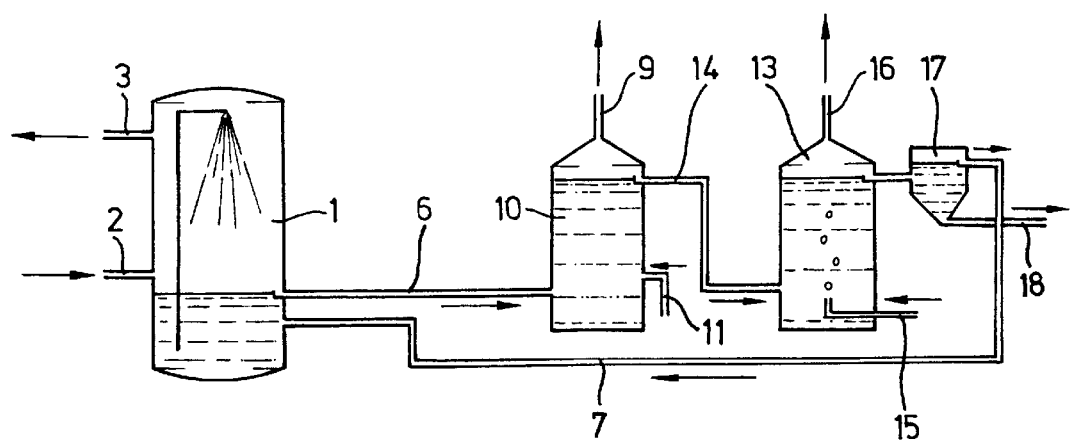
FIG. 5 shows a device for removing nitrogen oxides and sulphur oxides, with denitrification in the anaerobic sulphur reactor.

A flue gas flowing at 45,000 m³/h and containing 670 mg/m³ $SO_2$ (250 ppm v/v) and 1670 mg/m³ NOx (expressed in NO, contains 5–20% $NO_2$) (1340 ppm v/v) is treated in a flue-gas purification installation as shown in FIG. 5. The scrubber has a volume of 70 m³ and the scrubbing water flow rate is 600 m³/h. The anaerobic reactor has a volume of 275 m³ and the aerobic reactor has a volume of 45 m³. The circulation flow through the bioreactors is 110 m³/h. The scrubbing water contains 3 g Fe-EDTA per 1. The efficiency of SOx removal is 99% and the efficiency of NOx removal is 75–80%.

We claim:

1. In a process for purifying a flue gas containing nitrogen oxides, which comprises:

scrubbing the flue gas with a circulating scrubbing liquid containing a transition metal chelate, the chelate forming a complex with nitrogen oxide;

subsequently regenerating the transition metal chelate; and reducing nitrogen oxide to molecular nitrogen; the improvement wherein the transition metal chelate is biologically regenerated in the presence of an electron donor selected from the group consisting of hydrogen, alcohols organic materials, and reducing sulfur compounds.

2. Process according to claim 1, wherein the transition metal chelate is Fe(II) EDTA.

3. Process according to claim 1, wherein the electron donor is methanol, ethanol, or an organic matter-containing stream.

4. Process according to claim 1, wherein the electron donor is hydrogen.

5. Process according to claim 1, wherein regeneration of the transition metal chelate is carried out in the same device as that in which the flue gas is scrubbed.

6. Process according to claim 1, wherein the electron donor is sulphite.

7. Process according to claim 6, wherein the sulphite originates in part from sulphur dioxide present in the flue gas.

8. Process according to claim 1, wherein the electron donor is a reducing sulphur compound other than sulphite selected from the group consisting of sulphide, hydrosulphide, sulphur, thiosulphate and polythionate.

9. Process according to claim 8, wherein the sulfur compounds, other than sulphide, are biologically reduced to form sulphide, the sulphide is then oxidized to produce elemental sulphur, and the produced sulphur is separated off.

10. Process according to claim 9, wherein regeneration of the complex of nitrogen oxide and transition metal chelate is carried out in the same device as that in which sulphite and/or sulphate is biologically reduced.

* * * * *